No. 754,461. Patented March 15, 1904.

UNITED STATES PATENT OFFICE.

ANTON V. KOUBA, OF MILLIGAN, NEBRASKA.

PROCESS OF FERMENTING HONEY.

SPECIFICATION forming part of Letters Patent No. 754,461, dated March 15, 1904.

Application filed April 6, 1903. Serial No. 151,377. (No specimens.)

*To all whom it may concern:*

Be it known that I, ANTON V. KOUBA, a citizen of the United States, residing at Milligan, in the county of Fillmore and State of Nebraska, have invented a new and useful Process of Fermenting a Beverage, of which the following is a specification.

The beverage hereinafter described is prepared with natural honey as its base. Honey in the comb, however, is combined with certain natural products designed mainly for its preservation, such as wax, pollen, and certain acids. The first step in the process is to clarify the honey proper by freeing it of the undesired acids, wax, and such foreign substances as pollen. The honey is first mixed with substantially pure, not necessarily distilled, water. The quantity of water combined with the honey will depend on the strength it is desired to give the finished product; but for medium strength sufficient honey should be used with a given amount of water to bring the whole to a standard of 21° by saccharimeter test. The liquid thus formed is placed in a copper kettle or boiler and subjected to heat until it is brought to the boiling-point, and the wax, pollen will rise to the surface in the form of a scum or foam, while the formic acid found in the natural honey will be evaporated. The foam or scum is continuously removed, and the boiling and removal of foam and scum continues from two to three hours. Chalk to the amount of forty pounds to a hundred gallons of liquid is then slowly added for the purpose of absorbing the remaining acids and the boiling continued for thirty minutes longer. Charcoal (animal preferred) is then added in the proportion of fifty pounds to a hundred gallons of liquid, which will absorb and remove the undesirable flavor remaining in the honey. The liquid is then boiled for an hour longer. All scum rising to the top is at once removed at all stages of the boiling. When the boiling operation is completed, the liquid is run into a tank and cooled to about 60° Fahrenheit. The chalk and charcoal will settle to the bottom with any other sediment not previously removed, and the liquid is then drawn off into barrels and, if desired, is filtered. To aid in the fermentation of this liquid, I employ for one hundred gallons of liquid at a saccharimeter test of 21° the following: fifteen pounds of compressed vine-yeast, six ounces phosphate of ammonia, fifteen ounces tartrate of ammonia, twenty-five ounces bitartrate of potassium, eleven ounces of tartaric acid, six ounces of sulfate of magnesia. After the addition of the above the liquid is permitted to stand and ferment five or six weeks, the yeast forming in the bottoms of the barrels. The liquid is then drawn off from the yeast into clean barrels and allowed to stand until it is about six months old. The beverage thus made will ripen and increase in mellowness and flavor with age and is adapted for use either as a beverage or as a tonic.

Having thus fully described my invention, what I claim as new, and desire to secure by Letters Patent, is—

1. A process of fermenting a beverage consisting in taking natural honey, adding water to same, boiling the liquid thus formed removing all scum and foam during the boiling, adding chalk in the proportion of forty pounds to one hundred gallons of liquid, boiling approximately thirty minutes, adding charcoal in the proportion of fifty pounds to one hundred gallons of liquid, boiling one hour, cooling the liquid, drawing same off from the chalk and charcoal, and adding suitable ferments.

2. The process of fermenting a beverage consisting in mixing natural honey and water to a saccharimeter standard of substantially 21°, of boiling said liquid and continuously removing the foam and scum, of slowly adding chalk to the liquid in the proportion of substantially forty pounds of chalk to one hundred gallons of liquid, of continuing the boiling and removal of the scum and adding fifty pounds of animal charcoal to one hundred gallons of liquid, of running the liquid into a tank cooling and settling, of drawing the liquid off from the chalk and charcoal, and adding yeast and other ingredients adapted to produce a fermentation.

3. The process of the kind described consisting of clarifying a mixture of water and natural honey, of adding to one hundred gallons of the clarified liquid at a strength of 21° saccharimeter test, fifteen pounds of vine-yeast, six ounces of phosphate of ammonia, fifteen ounces of tartrate of ammonia, twenty-five ounces of bitartrate of potassium, eleven ounces of tartaric acid, and six ounces of sulfate of magnesia, substantially as described.

In testimony whereof I have signed my name to this specification in presence of two subscribing witnesses.

ANTON V. KOUBA.

Witnesses:
JOSEPH SIMECEK,
J. R. BARTAS.